(12) United States Patent
Kelsch et al.

(10) Patent No.: US 11,178,983 B1
(45) Date of Patent: Nov. 23, 2021

(54) MODULAR SECURITY CRADLE FOR SAFEGUARDING AN ARTICLE OF MERCHANDISE AGAINST THEFT

(71) Applicants: Christopher A. Kelsch, Palm Harbor, FL (US); Vanguard Products Group, Inc., Oldsmar, FL (US)

(72) Inventors: Christopher A. Kelsch, Palm Harbor, FL (US); Jasen Paul Biggins, Tampa, FL (US); Lee Eckert, Sarasota, FL (US); John N. Figh, Jr., Oldsmar, FL (US)

(73) Assignee: Vanguard Products Group, Inc., Oldsmar, FL (US)

( * ) Notice: Subject to any disclaimer, the term of this patent is extended or adjusted under 35 U.S.C. 154(b) by 0 days.

(21) Appl. No.: 17/149,311

(22) Filed: Jan. 14, 2021

Related U.S. Application Data

(60) Provisional application No. 62/960,952, filed on Jan. 14, 2020.

(51) Int. Cl.
*A47F 5/04* (2006.01)
*H02J 7/00* (2006.01)
*E05B 73/00* (2006.01)

(52) U.S. Cl.
CPC ............ *A47F 5/04* (2013.01); *E05B 73/0017* (2013.01); *H02J 7/0044* (2013.01)

(58) Field of Classification Search
CPC .. A47F 5/04; A47F 5/0861; A47F 7/00; A47F 7/02; E05B 73/0017
See application file for complete search history.

(56) References Cited

U.S. PATENT DOCUMENTS

| 6,700,488 B1 * | 3/2004 | Leyden | G08B 13/1463 340/568.1 |
| 8,191,851 B2 * | 6/2012 | Crown | F16M 11/041 248/553 |
| 8,464,563 B2 * | 6/2013 | Perez | E05B 73/0023 70/57.1 |

(Continued)

OTHER PUBLICATIONS

InVue Security Products, Security for High Theft Smartwatches on Display, https://invue.com/retail-security/display-merchandise/smartwatches/ retrieved Feb. 12, 2021.

(Continued)

*Primary Examiner* — Hoi C Lau
(74) *Attorney, Agent, or Firm* — Andriy Lytvyn; Smith & Hopen, P.A.

(57) ABSTRACT

An anti-theft device for securing a wearable electronic against unauthorized removal from a display counter. An insert module has an interstitial space shaped to accommodate the geometry of the wearable electronic. The insert module has an open configuration, in which the wearable gadget can be received into the interstitial space, and a closed configuration, in which the wearable gadget cannot be removed from the interstitial space. A universal cradle configured to receive the insert module. The universal cradle having an interlocked configuration in which the universal cradle is configured to retain the insert module in the closed configuration. A locking member is configured to immobilize the universal cradle in the interlocked configuration.

20 Claims, 10 Drawing Sheets

(56) References Cited

U.S. PATENT DOCUMENTS

| | | | | |
|---|---|---|---|---|
| 8,701,452 B2* | 4/2014 | Foster | E05B 73/0082 | 70/19 |
| 8,814,128 B2* | 8/2014 | Trinh | F16M 11/041 | 248/551 |
| 8,864,089 B2* | 10/2014 | Hung | F16M 11/041 | 248/274.1 |
| 8,925,886 B2* | 1/2015 | Sears | F16M 13/00 | 248/309.1 |
| 8,985,544 B1* | 3/2015 | Gulick, Jr. | A47F 7/024 | 248/551 |
| 9,022,337 B2* | 5/2015 | Petruskavich | F16M 11/08 | 248/316.4 |
| 9,097,380 B2* | 8/2015 | Wheeler | F16M 13/00 | |
| 9,105,166 B1* | 8/2015 | Kelsch | G08B 13/149 | |
| 9,159,309 B2* | 10/2015 | Liu | H04M 1/11 | |
| 9,161,466 B2* | 10/2015 | Huang | F16M 11/105 | |
| 9,285,832 B2* | 3/2016 | Galant | G06F 21/88 | |
| 9,309,698 B2* | 4/2016 | Vroom | G06F 1/1632 | |
| 9,347,245 B2* | 5/2016 | Vroom | F16B 2/065 | |
| 9,567,776 B2* | 2/2017 | Moock | E05B 73/0082 | |
| 9,568,141 B1* | 2/2017 | Zaloom | F16M 11/24 | |
| 9,593,510 B2* | 3/2017 | Vroom | G06F 21/86 | |
| 9,650,814 B2* | 5/2017 | Vroom | F16H 35/10 | |
| 9,663,977 B2* | 5/2017 | Vroom | G06F 13/4282 | |
| 9,725,930 B2* | 8/2017 | Vroom | F16H 35/10 | |
| 9,936,823 B2* | 4/2018 | Galant | A47F 3/002 | |
| 9,970,217 B2* | 5/2018 | Moock | G08B 13/06 | |
| 9,972,178 B2* | 5/2018 | Richardson | G06Q 30/0185 | |
| 9,996,111 B2* | 6/2018 | Vroom | G06F 13/4282 | |
| 10,001,153 B1* | 6/2018 | Fan | F16M 11/041 | |
| 10,043,356 B2* | 8/2018 | Richardson | G06Q 30/0185 | |
| 10,165,873 B2* | 1/2019 | Gulick, Jr. | E05B 73/00 | |
| 10,223,883 B2* | 3/2019 | Richardson | G06Q 30/0185 | |
| 10,227,796 B2* | 3/2019 | Moock | E05B 47/0012 | |
| 10,323,440 B1* | 6/2019 | Kelsch | E05B 73/0064 | |
| 10,378,248 B1* | 8/2019 | Kelsch | E05B 73/0017 | |
| 10,448,759 B1* | 10/2019 | Chapuis | A47F 5/16 | |
| 10,459,486 B2* | 10/2019 | Vroom | G06F 21/88 | |
| 10,706,695 B2* | 7/2020 | Richardson | G08B 13/1454 | |
| 10,725,500 B2* | 7/2020 | Vroom | F16B 2/065 | |
| 10,738,508 B2* | 8/2020 | Moock | F16M 11/041 | |
| 10,851,935 B1* | 12/2020 | Huang | G06F 1/1637 | |
| 10,925,414 B2* | 2/2021 | Gulick, Jr. | F16M 11/041 | |
| 11,015,626 B2* | 5/2021 | Leyden | E05B 73/0082 | |
| 11,035,151 B2* | 6/2021 | Kelsch | E05B 73/0082 | |
| 2010/0079285 A1* | 4/2010 | Fawcett | G08B 13/149 | 340/568.1 |
| 2010/0108828 A1* | 5/2010 | Yu | F16M 13/00 | 248/123.11 |
| 2010/0148030 A1* | 6/2010 | Lin | B60R 11/0252 | 248/371 |
| 2011/0254661 A1* | 10/2011 | Fawcett | G08B 13/2482 | 340/5.61 |
| 2012/0032805 A1* | 2/2012 | Brodzik | E05B 73/0064 | 340/572.8 |
| 2012/0037783 A1* | 2/2012 | Alexander | A47F 7/024 | 248/551 |
| 2012/0047972 A1* | 3/2012 | Grant | E05B 45/00 | 70/77 |
| 2012/0103863 A1* | 5/2012 | Perez | E05B 73/0023 | 206/586 |
| 2012/0234055 A1* | 9/2012 | Bland, III | E05B 73/0082 | 70/15 |
| 2012/0312936 A1* | 12/2012 | Huang | F16M 13/00 | 248/122.1 |
| 2013/0141240 A1* | 6/2013 | Valiulis | A47F 5/0823 | 340/568.8 |
| 2013/0301216 A1* | 11/2013 | Trinh | A47F 7/0246 | 361/679.58 |
| 2014/0060218 A1* | 3/2014 | Bisesti | F16M 11/041 | 73/865.8 |
| 2014/0071643 A1* | 3/2014 | Yang | H05K 5/0208 | 361/755 |
| 2014/0352372 A1* | 12/2014 | Grant | A47F 5/0861 | 70/57.1 |
| 2014/0362517 A1* | 12/2014 | Moock | E05B 73/0082 | 361/679.43 |
| 2015/0185709 A1* | 7/2015 | Vroom | G06F 21/31 | 318/476 |
| 2015/0185774 A1* | 7/2015 | Vroom | G05B 9/02 | 248/544 |
| 2015/0185775 A1* | 7/2015 | Vroom | G05B 9/02 | 74/89.17 |
| 2015/0185776 A1* | 7/2015 | Vroom | G06F 21/31 | 361/679.42 |
| 2015/0185777 A1* | 7/2015 | Vroom | F16B 2/065 | 361/679.42 |
| 2015/0186630 A1* | 7/2015 | Vroom | G07C 9/00174 | 726/21 |
| 2015/0186685 A1* | 7/2015 | Vroom | G05B 9/02 | 726/35 |
| 2015/0196140 A1* | 7/2015 | Lin | A47F 7/0246 | 248/551 |
| 2015/0300050 A1* | 10/2015 | Van Balen | A47F 5/0087 | 248/551 |
| 2016/0117897 A1* | 4/2016 | Grant | G08B 13/06 | 340/568.8 |
| 2016/0201359 A1* | 7/2016 | Berglund | G08B 13/1472 | 70/58 |
| 2016/0335860 A1* | 11/2016 | Richardson | G06Q 30/0185 | |
| 2017/0049251 A1* | 2/2017 | Gulick, Jr. | A47F 7/0246 | |
| 2017/0076569 A1* | 3/2017 | Bisesti | G08B 13/149 | |
| 2017/0107742 A1* | 4/2017 | Moock | E05B 47/0012 | |
| 2017/0139440 A1* | 5/2017 | Vroom | F16B 2/065 | |
| 2017/0308121 A1* | 10/2017 | Vroom | G06F 13/4282 | |
| 2017/0330432 A1* | 11/2017 | Richardson | G08B 13/1454 | |
| 2018/0258669 A1* | 9/2018 | Moock | G06F 1/1632 | |
| 2018/0261058 A1* | 9/2018 | Richardson | G06Q 30/0185 | |
| 2018/0330587 A1* | 11/2018 | Richardson | G08B 13/1454 | |
| 2019/0125104 A1* | 5/2019 | Gulick, Jr. | G08B 13/14 | |
| 2019/0178010 A1* | 6/2019 | Moock | E05B 73/0082 | |
| 2019/0316386 A1* | 10/2019 | Gulick, Jr. | E05B 73/0082 | |
| 2020/0040614 A1* | 2/2020 | Kelsch | E05B 73/0017 | |
| 2020/0058203 A1* | 2/2020 | Richardson | G06Q 30/0185 | |
| 2020/0107653 A1* | 4/2020 | Leyden | E05B 73/0082 | |
| 2020/0347648 A1* | 11/2020 | Moock | E05B 73/0082 | |
| 2020/0348724 A1* | 11/2020 | Vroom | E05B 73/0082 | |
| 2020/0372771 A1* | 11/2020 | Richardson | G08B 13/1454 | |
| 2020/0400268 A1* | 12/2020 | Yang | F16M 11/40 | |
| 2021/0040779 A1* | 2/2021 | Kelsch | E05B 73/0023 | |
| 2021/0123268 A1* | 4/2021 | Gulick, Jr. | F16M 11/041 | |
| 2021/0169239 A1* | 6/2021 | Gulick, Jr. | F16M 11/041 | |

OTHER PUBLICATIONS

MTI, Smart Watch Stand Solutions, https://mtigs.com/retail-security/wearables retrieved Feb. 12, 2021.

Sennco Solutions Inc., Heavy Duty Lockdown Security Systems, https://sennco.com/heavy-duty-lockdown/ Feb. 12, 2021.

* cited by examiner

MODULAR SECURITY CRADLE FOR SAFEGUARDING AN ARTICLE OF MERCHANDISE AGAINST THEFT

PRIORITY CLAIM

This non-provisional application claims priority to U.S. Provisional Patent Application No. 62/960,952 filed on Jan. 14, 2020 by the same inventors.

BACKGROUND OF THE INVENTION

1. Field of the Invention

This invention relates to merchandise anti-theft devices. More specifically, it relates to a modular security cradle for safeguarding an article of merchandise against theft.

2. Brief Description of the Related Art

Retailers often prefer to present their merchandise to consumers in a way that allows the consumers to touch, inspect, and otherwise interact with the products at a display counter. Many merchandise items, especially portable electronic devices, are relatively expensive and, therefore, are under a serious threat of theft. Retailers often face a dilemma of balancing a need to interactively display their merchandise to attract customers and increase sales with a need to safeguard the merchandise against theft.

Wearable electronics—such as smart watches and fitness trackers—are at a high risk of theft because they are expensive and are in high demand. Wearable electronics are also difficult to secure at the point of display due to significant variations in their shapes and sizes. Although there are numerous types of versatile anti-theft devices for safeguarding articles or merchandise having generally rectangular shapes—such as mobile phones and tablet computers—such anti-theft devices are not suited for securing wearable devices.

Currently, anti-theft devices for securing wearable electronics are generally designed to fit the geometry of a specific wearable electronic gadget. When a subsequent generation of wearable electronic gadgets is released, anti-theft devices designed for the previous generation may become obsolete. Considering the high pace of the market, lack of versatility of the anti-theft devices constitutes a major inefficiency and may significantly delay a retailer's ability to securely display newly-released wearable electronics.

Thus, what is needed is a high-strength reusable modular anti-theft device having an interchangeable, merchandise-specific insert module that can be quickly designed, manufactured, and deployed in a cost-effective manner.

SUMMARY OF THE INVENTION

The problem stated above is now resolved by a novel and non-obvious anti-theft device for securing an article of merchandise. In an embodiment, the anti-theft device has an insert module having an interstitial space defined therein. When the insert module is in an open configuration, the interstitial space of the insert module is accessible for receipt or removal of the article of merchandise. On the other hand, when the insert module is in a closed configuration, the interstitial space is at least partially enclosed, such that the article of merchandise received into the interstitial space cannot be removed therefrom.

The anti-theft device further includes a universal cradle. The universal cradle has a first interlocking component and a second interlocking component. The two interlocking components can be coupled in a sliding relation with respect to one another. The first interlocking component has a first grip, and the second interlocking component has a second grip. Each grip is configured to receive at least a portion of a surface, a corner, or an edge of the insert module.

The universal cradle has an unlocked configuration, in which the grips of the first and the second components are separated by a first distance sufficient to enable the insert module to be received into the grips. When the universal cradle is in an interlocked configuration, the first and the second grips are separated by a second distance, shorter than the first distance, such that the insert module received into the first and the second grips cannot be removed therefrom. Furthermore, in the interlocked configuration, the grips of the universal cradle retain the insert module in the closed configuration, thereby restraining the insert module from transitioning into the open configuration.

The anti-theft device further includes a locking member having a first retracted position and a second engaged position. When the locking member is in the retracted position, the first and the second interlocking components of the universal cradle are free to slide relative to one another. However, when the locking member is in the engaged position, the locking member restrains the first and the second interlocking components against relative movement with respect to one another, thereby immobilizing the universal cradle in the interlocked configuration.

To release the article of merchandise received within the interstitial space of the insert module, the locking member must be transitioned into the first retracted position. Then, the universal cradle must be transitioned into the unlocked configuration, after which the insert module must be transitioned into the open configuration. Upon completion of these steps, the article of merchandise can be removed from the anti-theft device.

According to an aspect of the anti-theft device, one insert module can be swapped out for another insert module having a second interstitial space, shaped to accommodate a second, differently shaped article of merchandise. Although the interstitial space of each insert module may be shaped differently to accommodate different shapes of the articles of merchandise, the exterior shape and dimensions of each insert module are substantially the same.

In an embodiment, the insert module comprises a first portion and a second portion, wherein the first portion and the second portion are coupled together when the insert module is in the closed configuration. In an alternative embodiment, the insert module may be a single-piece component. In other embodiments, the insert module may comprise more than two portions. All of these variants fall within the scope of the invention.

In an embodiment, the first interlocking component of the universal cradle comprises a channel configured to receive the second interlocking component.

In an embodiment, the first and the second interlocking components of the universal cradle are configured to slide apart to transition the universal cradle into the unlocked configuration and configured to slide toward one another to transition the universal cradle into the interlocked configuration. Furthermore, the first and second interlocking components may be configured to decouple from one another when the universal cradle is in the unlocked configuration.

The insert module may include a recess configured to receive a wireless charging device for supplying power to the article of merchandise.

In an embodiment, the universal cradle is configured to couple to a pedestal anchored to a display surface. When the universal cradle is coupled to the pedestal, access to the locking member is concealed.

The first and the second interlocking components of the universal cradle can be made of a metal or a metal alloy, while the insert module can be made of a polymer.

DESCRIPTION OF THE DRAWINGS

For a fuller understanding of the invention, reference should be made to the following detailed description, taken in connection with the accompanying drawings, in which.

DETAILED DESCRIPTION OF THE PREFERRED EMBODIMENT

In the following detailed description of the preferred embodiment, reference is made to the accompanying drawings, which form a part hereof, and within which specific embodiments are shown by way of illustration by which the invention may be practiced. It is to be understood that other embodiments may be utilized and structural changes may be made without departing from the scope of the invention.

Figure 1:
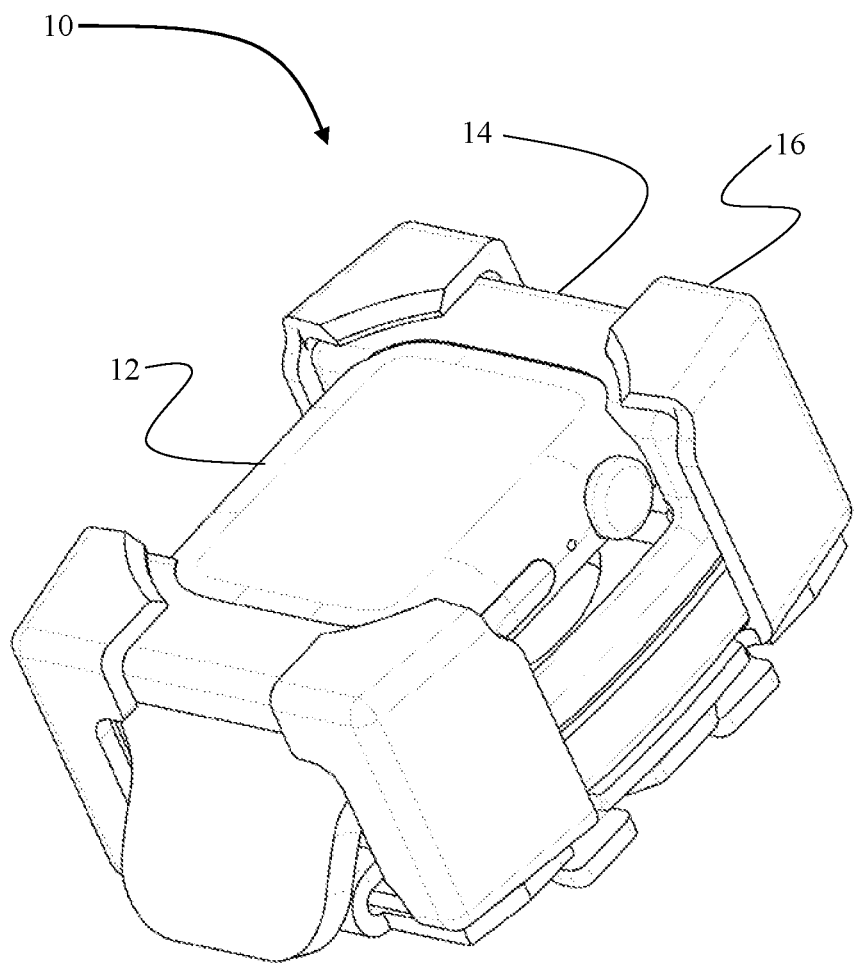
FIG. 1 is a perspective view of the anti-theft device according to an embodiment of the invention.

FIG. 1 depicts an isometric view of an anti-theft device 10 configured to secure an article of merchandise 12, for example a wearable electronic, such as a smartwatch. Anti-theft device 10 comprises an interchangeable insert module 14 nested within a high-strength universal cradle 16.

In an embodiment, high-strength universal cradle 16 is manufactured from a metal or a metal alloy, for example aluminum or steel. On the other hand, insert module 14 may be made from an inexpensive, easy-to-fabricate material, such as a polymer, for example a plastic. When insert module 14 is secured within universal cradle 16, universal cradle 16 at least partially encases insert module 14. In this manner, metal universal cradle 16 functions as a high-strength exoskeleton for plastic insert module 14.

As depicted in FIG. 1, anti-theft device 10 comprises a two-part assembly: (1) a high-strength metal universal cradle 16, and (2) a low-cost, quick-to-fabricate interchangeable insert module 14 nested within universal cradle 16. While universal cradle 16 is agnostic to the specific shape of wearable electronic 12, interchangeable insert module 14 is designed specifically to accommodate the exact shape of wearable electronic 12.

A key aspect of an effective anti-theft device is its ability to resist physical tampering. In anti-theft device 10, universal cradle 16 provides the necessary structural strength to achieve this objective. Accordingly, because universal cradle 16 ensures sufficient structural strength of anti-theft device 10, insert module 14 can be fabricated from a lower-strength material, such as a polymer, without diminishing the ability of anti-theft device 10 to be impervious to physical tampering. This novel configuration of anti-theft device 10 achieves multiple advantages, some of which are explained below.

First, anti-theft device 10 can be adapted to accommodate geometry of wearable electronic 12 simply by selecting an insert module 14 designed specifically for wearable electronic 12. When a retailer wishes to secure a different wearable electronic 12, the retailer can swap out current insert module 14 for another insert module 14, designed specifically for the wearable electronic 12 the retailer wishes to securely display. For example, when a new smartwatch design is revealed, the retailer does not need to purchase an entire new anti-theft device to secure that new smartwatch. Instead, the retailer can simply order a new insert module 14, which can be readily designed and fabricated specifically to accommodate the new smartwatch design. Then, the retailer can use new insert module 14, in conjunction with the existing universal cradle 16, to securely display the new smartwatch using anti-theft device 10. Therefore, the present invention obviates a need to purchase an entirely new anti-theft device 10 every time the design of wearable electronic 12 changes. Simply stated, the present invention enables a retailer to invest in universal cradle 16 and periodically order the exact insert module 14 needed to display the desired wearable electronic 12 while leveraging the investment in universal cradle 12.

Second advantage of anti-theft device 10 is cost efficiency. Because insert module 14 can be fabricated from a low-cost material, without sacrificing the ability of anti-theft device 10 to withstand tampering attempts, insert module 14 can be interchanged on-demand, without requiring significant investment.

Third advantage is that, due to being fabricated from plastic rather than metal, insert module 14 can be designed and produced quickly, enabling retailers to keep up with rapidly changing designs of wearable electronic 12.

Fourth advantage is unobtrusive appearance of anti-theft device 10. In an embodiment, insert module 14 can be fabricated from an acrylic—thereby minimizing visual occlusion of wearable electronic 12.

Figure 2A:
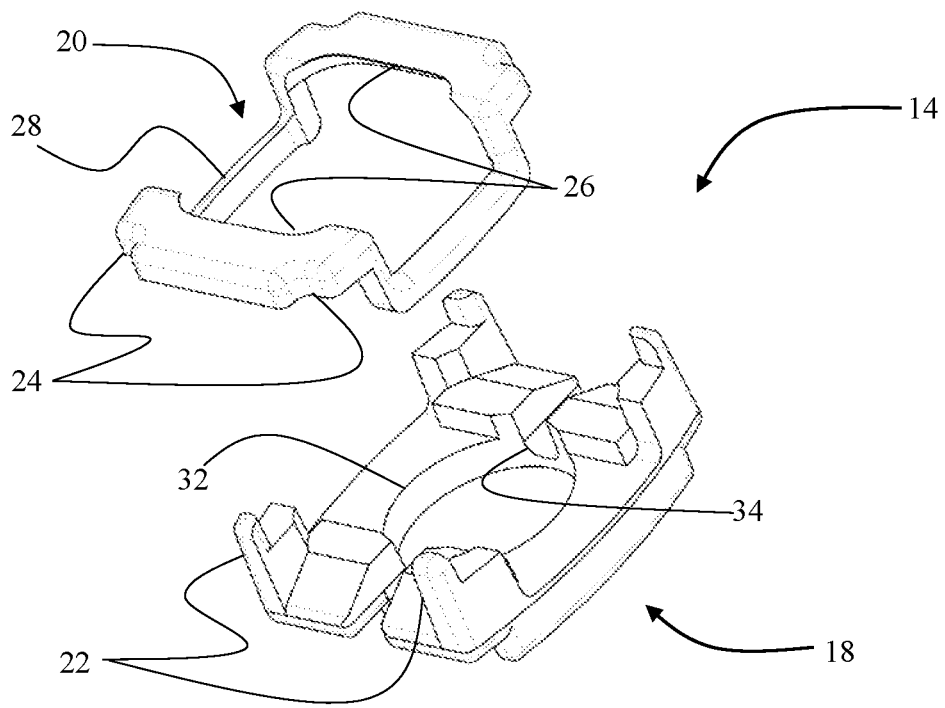
FIG. 2A is a perspective view depicting a two-portion insert module in an open configuration.
Figure 2B:
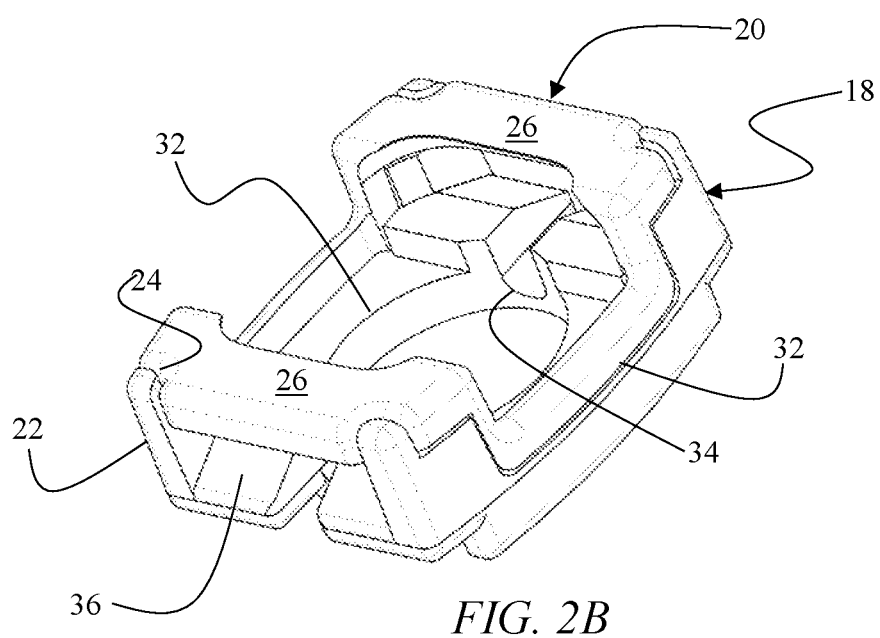
FIG. 2B is a perspective view depicting the two-portion insert module in a closed configuration.

FIGS. 2A and 2B depict interchangeable insert module 14 in more detail. FIG. 2A depicts insert module 14 in an open configuration, in which wearable electronic 12 can be placed into an interstitial space within insert module 14 and removed therefrom. In the embodiment depicted in FIGS. 2A and 2B, insert module 14 comprises two interlocking portions: a bottom portion 18 and a top portion 20. In this embodiment, bottom portion 18 comprises a plurality of protrusions 22 defining the interstitial space therebetween configured to receive wearable electronic 12.

FIG. 2A depicts top portion 20 having a plurality of grooves 24, complementary to the plurality of protrusions 22. Each groove 24 is configured to receive a corresponding protrusion 22. When top portion 20 is interlocked with bottom portion 18, as depicted in FIG. 2B, insert module 14 is transitioned into a closed configuration. Top portion 20 is shaped such that, when it is coupled to bottom portion 18, top portion 20 at least partially encloses the interstitial space, thereby immobilizing wearable electronic 12. In this manner, in the closed configuration of insert module 14, wearable electronic 12 is sandwiched between top portion 20 and bottom portion 18. In this closed configuration, wearable electronic 12 cannot be removed from insert module 14 until top portion 20 is at least partially disengaged from bottom portion 18.

It the embodiment depicted in FIGS. 2A and 2B, top portion 20 comprises two retaining members 26. Retaining members 26 are configured to engage edges, corners, and/or surfaces of wearable electronic 12, thus restraining wearable electronic 12 against unauthorized removal from the interstitial space of insert module 14. Notably, as depicted in FIG. 1, retaining members 26 do not obstruct the touchscreen of wearable electronic 12, so that a prospective customer has full access thereto. Furthermore, top portion 20 may comprise two low-profile bridges 28 connecting retaining members 26. In the closed configuration of insert module 14, bridges 28 do not obstruct the lateral sides of wearable electronic 12, thus ensuring that prospective customers and retail staff have full access to control dials and/or buttons that may be disposed on the lateral sides of wearable electronic 12.

FIGS. 2A and 2B further depict that bottom portion 18 includes a recess 32. In an embodiment, recess 32 is used to hold an inductive wireless charging device for supplying power to wireless electronic 12. To that end, bottom portion 18 further includes one or more channels 34 configured to receive a charging cable for connecting the wireless charger to a power source, such as an electrical outlet. FIG. 2B also depicts that top portion 20 and bottom portion 18 may be shaped such that when they are interlocked, they are configured to leave open one or more apertures 36 on the lateral sides of insert module 14, wherein apertures 36 are configured to accommodate a wristband of wearable electronic 12, as shown in FIG. 1.

Figure 3A:
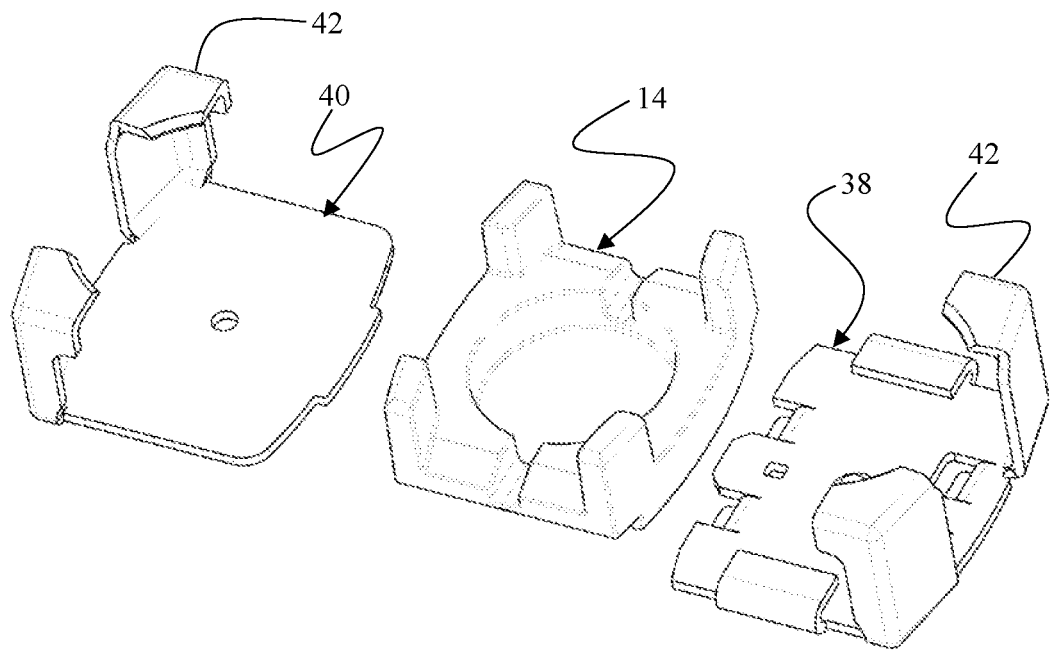
FIG. 3A is a perspective view depicting a single-component insert module positioned between two components of the universal cradle.
Figure 3B:
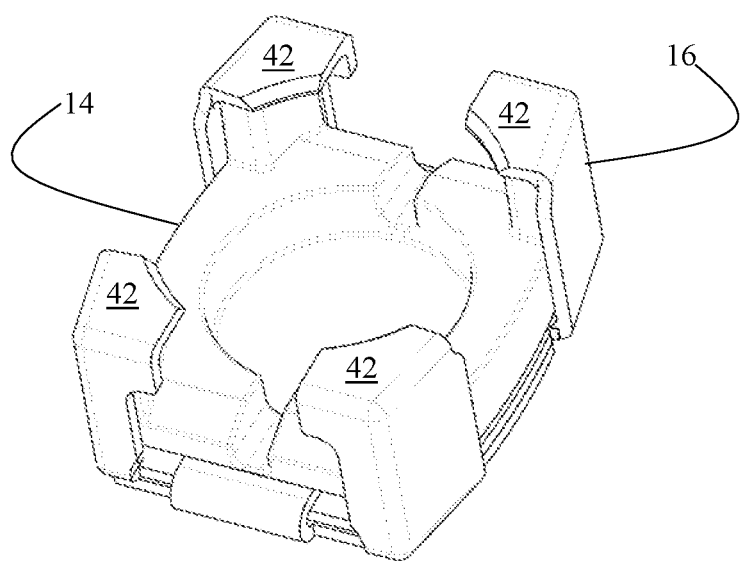
FIG. 3B is a perspective view depicting the single-component insert module secured within the universal cradle.

FIGS. 3A and 3B depict an alternative embodiment, in which insert module 14 may comprise a single component, rather than two separate portions 18 and 20. FIG. 3A depicts that single-component insert module 14 has an interstitial space configured to receive wearable electronic 12. FIG. 3B depicts that, in the closed configuration, this single-component insert module 14 is secured within universal cradle 16. In this embodiment, the structure of universal cradle 16 itself at least partially encloses the interstitial space, thereby preventing unauthorized removal of the wearable electronic 12. In this manner, grips 42 of universal cradle 16 are configured to engage corners, edges, or a surface of wearable electronic 12, thereby immobilizing wearable electronic 12 within the interstitial space of insert module 14.

In the embodiment depicted in FIGS. 3A and 3B, single-component insert module 14 comprises only bottom portion 18. Alternatively, single-component insert module 14 may comprise only top portion 20. In either configuration, the structure of universal cradle 16 at least partially encloses the interstitial space of insert module 14 to immobilize wearable electronic 12 therein. The single-component embodiment may be particularly suited for a larger wearable electronic 12 having a greater thickness.

Figure 4A:
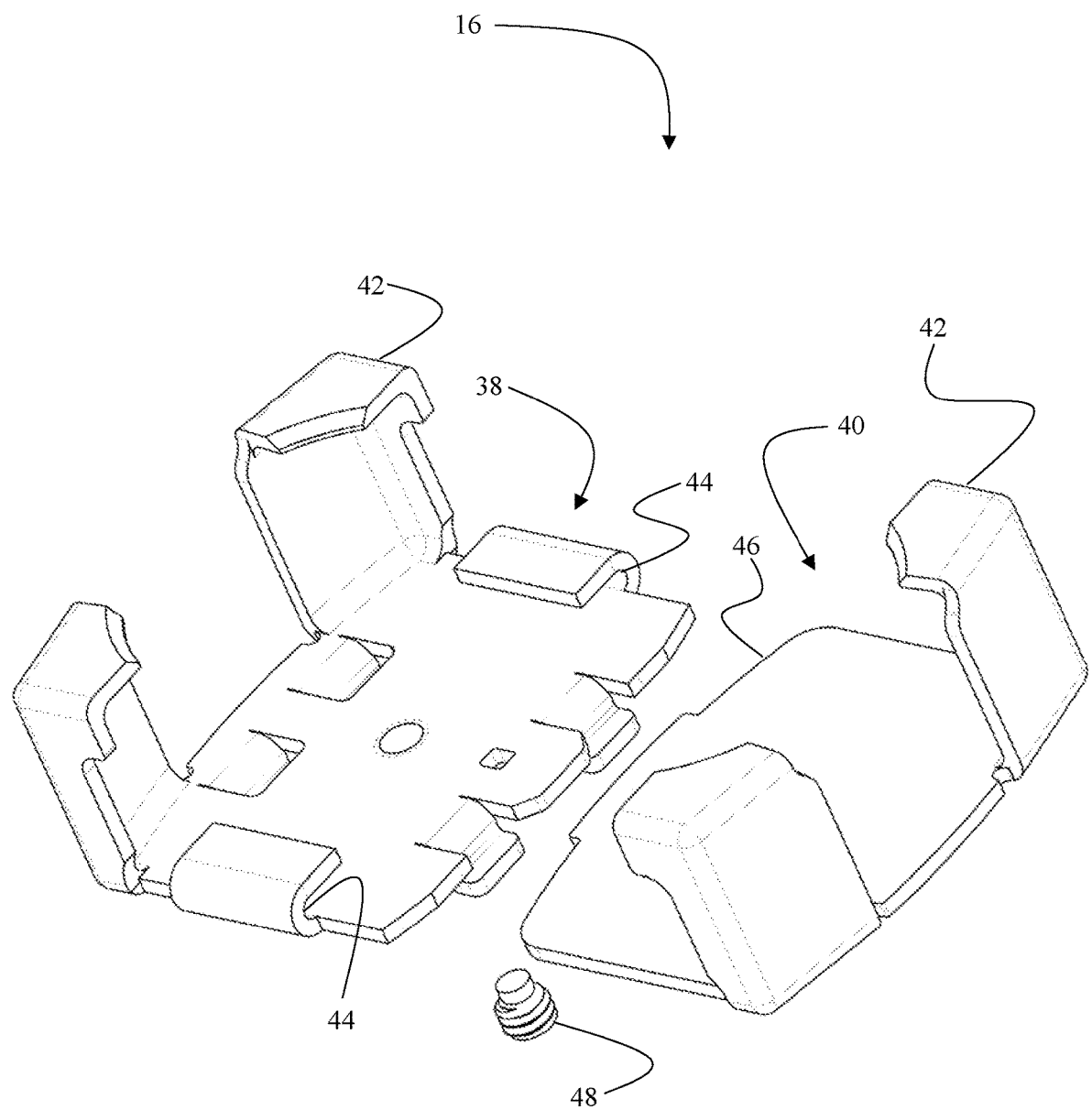
FIG. 4A is a perspective view depicting the universal cradle in an unlocked configuration.
Figure 4B:
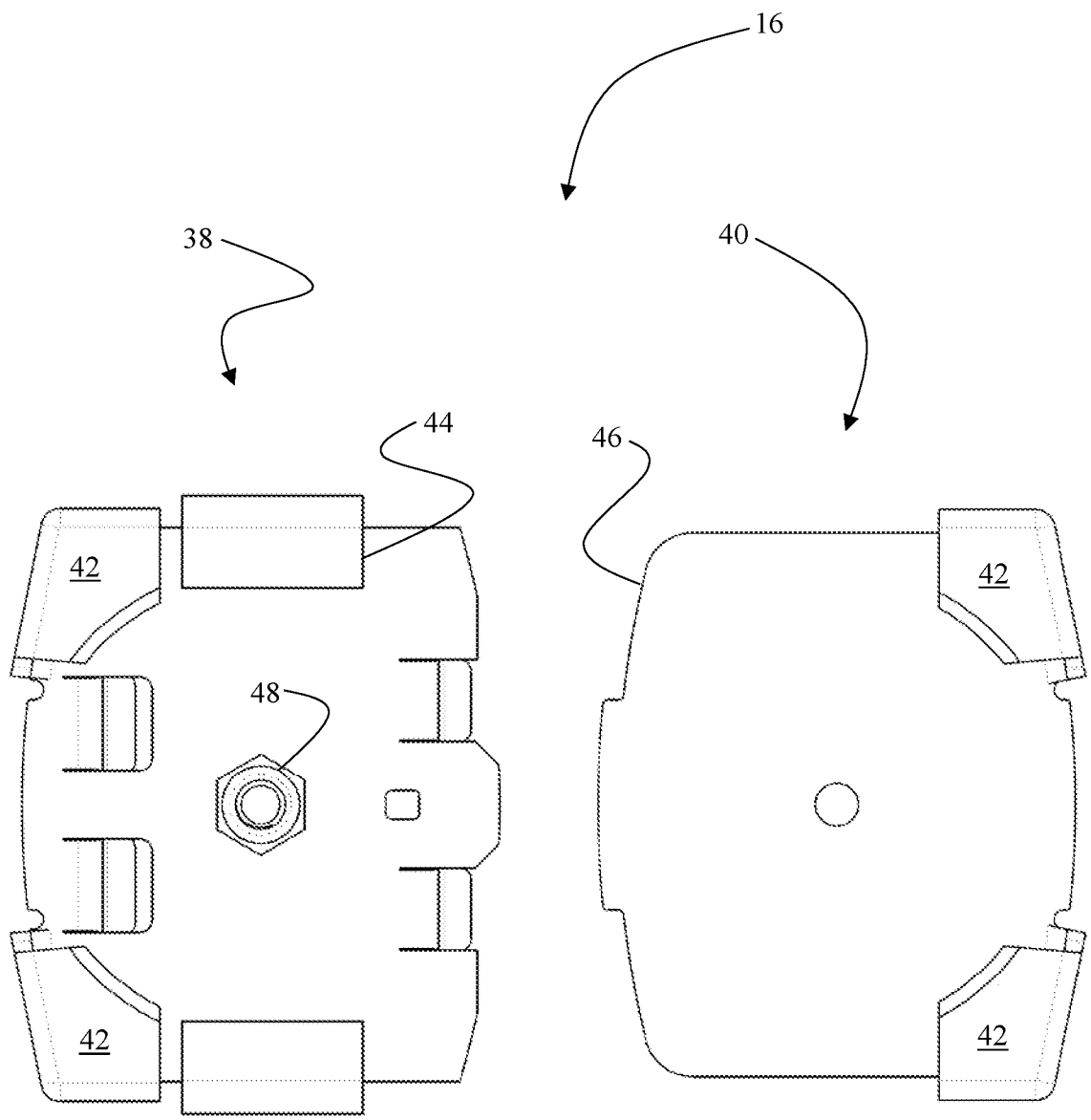
FIG. 4B is a top view depicting the universal cradle in the unlocked configuration.
Figure 4C:
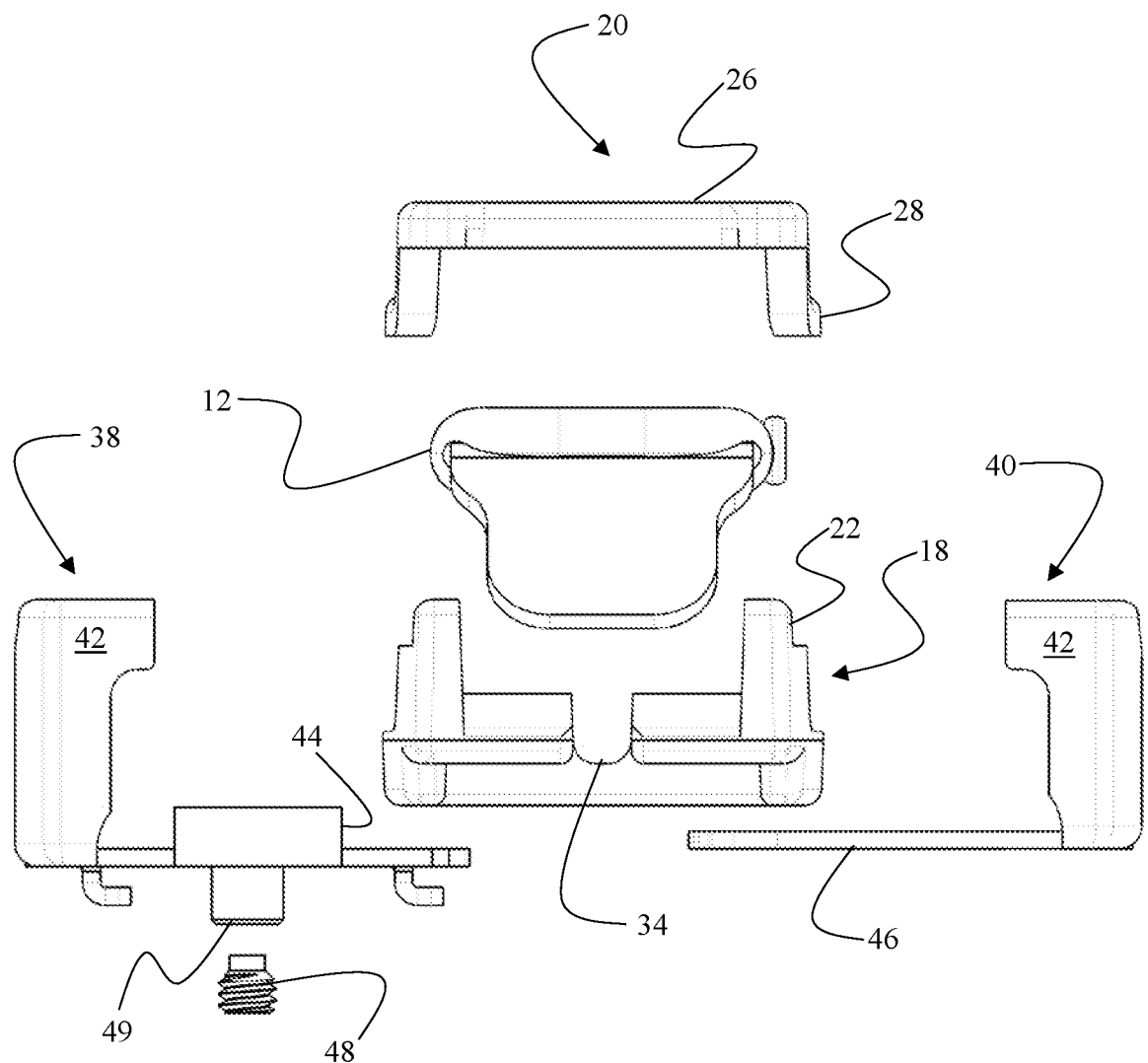
FIG. 4C is an exploded front view depicting the universal cradle receiving the insert module and a wearable electronic.

Next, FIGS. 4A-4C depict universal cradle 16 configured to receive insert module 14. Universal cradle 16 is transitionable between an unlocked configuration, which is depicted in FIGS. 4A-4C, and a locked configuration, depicted in FIG. 1. In the embodiment depicted in FIGS. 4A-4C, universal cradle 16 comprises a first interlocking component 38 and a second interlocking component 40. Interlocking components 38 and 40 have one or more grips 42 configured to receive and retain insert module 14.

As depicted in FIG. 4C, in the unlocked configuration, first and second interlocking components 38 and 40 are positioned such that grips 42 are separated by a distance sufficient to allow passage of insert module 14 therebetween. In an embodiment, interlocking components 38 and 40 may be configured to detach from one another, as depicted in FIG. 4C. To secure insert module 14 within universal cradle 16, insert module 14 is placed within grips 42 of first interlocking member 38. Insert module 14 is shaped such that it securely fits within grips 42 of universal cradle 16, ensuring that when universal cradle 16 is in the locked configuration, insert module 14 cannot be removed therefrom. Furthermore, when universal cradle 16 is in the locked configuration, grips 42 restrain bottom and top portions 18 and 20 of insert module 14 against being separated from one another. In this manner, universal cradle 16 retains insert module 14 in the closed configuration, depicted in FIG. 2B. In this manner, wearable electronic 12 cannot be removed from the insert module 14, while insert module 14 is secured within universal cradle 16.

After insert module 14 is placed into grips 42 of first interlocking member 38, second interlocking member 40 is coupled to first interlocking member 38, and grips 42 of both interlocking members 40 and 38 engage insert module 14. This is the interlocked configuration of universal cradle 16. In this interlocked configuration, insert module 14 cannot be removed from grips 42 of universal cradle 16, until interlocking members 38 and 40 are separated from one another and insert module 14 is released from grips 42.

Interlocking components 38 and 40 can be configured to couple with one another using a variety of means known in the art. In the exemplary embodiment depicted in FIGS. 4A-4C, first interlocking component 38 has a pair of opposite channels 44 configured to receive a base plate 46 of the second interlocking component 40. A lock member 48—in this embodiment, a set screw—is used to immobilize second interlocking component 40 relative to first interlocking component 38 to retain universal cradle 16 in its interlocked configuration. Other means of coupling interlocking component 38 and 40 and other types of locking members 48 are known in the art and fall within the scope of this invention.

In an embodiment, universal cradle 16 is manufactured of a high-strength material, such as a metal or a metal alloy. Therefore, grips 42 of universal cradle 16 cannot be easily broken using brute manual force or conventional manual tools. Accordingly, insert module 14 cannot be forcefully removed from universal cradle 16 without first unlocking universal cradle 16. Moreover, as explained above, while insert module 14 remains within universal cradle 16, top and bottom portions of insert module 14 cannot be separated from one another, and, therefore, wearable electronic 12 cannot be removed from anti-theft device 10.

Because universal cradle 16 at least partially encases insert module 14, the high-strength material of universal cradle 16 provides structural reinforcement for insert module 14. As explained above, insert module 14 can be manufactured from a lower-strength material that avails itself to rapid manufacturing at a lower cost—for example, a polymer—which enables retailers to replace insert module 14 quickly and efficiently. Because insert module 14 is made of a polymer, redesigning the shape of the interstitial space of insert module 14 to accommodate the geometry of a specific wearable electronic 12 can be accomplished on-demand. This aspect of the invention ensures a perfect custom fit of insert module 14 with respect to wearable electronic 12. The precision of the fit is important for both security and customer experience when the customer interacts with wearable electronic 12.

While the shape of the interstitial space of insert module 14 is customized to accommodate a specific wearable electronic 12, the exterior shape of insert module 14 remains unchanged. For this reason, insert modules 14 are interchangeable because the exterior shape of every insert module 14 is always complementary to the shape of grips 42 of universal cradle 16, ensuring a secure fit.

In an embodiment, the interstitial space of insert module 14 can be shaped to accommodate a security sensor. The security sensor can be configured to generate an alarm signal responsive to detecting an unauthorized removal of the wearable electronic gadget, thereby providing an additional level of theft protection.

FIGS. 5 and 6A-6C depict that universal cradle 16 may be configured to be locked to a pedestal 50 anchored to a display counter. This functionality can be accomplished by disposing a plurality of hooks 52 onto the bottom surface of first interlocking component 38 of universal cradle 16. These hooks 52 are sized and constructed to be received into the complementary apertures 54 disposed on a top surface of pedestal 50, as depicted in the exploded view provided in FIG. 5. The locking mechanism for securing universal cradle 16 to pedestal 50 may be of a type disclosed in the U.S. Pat. No. 10,323,440 entitled "Anti-Theft Device Having an Interlocking Assembly For Securing an Article of Merchandise," which is incorporated herein by reference.

When universal cradle 16 is coupled to pedestal 50, access port 49 to locking member 48 is concealed. Thus, locking member 48 cannot be accessed or operated until universal cradle 16 is removed from pedestal 50, exposing access port 49. To remove universal cradle 16 from pedestal 50, a locking mechanism disposed within pedestal 50 must be unlocked using a specialized key or other tool inserted into an opening 56 disposed on pedestal 50.

Furthermore, in an embodiment (not depicted in the drawings) one of the interlocking components of universal cradle 16 may be integrated directly into pedestal 50. In this embodiment, pedestal 50 may have a feature extending therefrom configured to complement the interlocking component of universal cradle 16. In this manner, when the first interlocking component of universal cradle 16 is locked to pedestal 50, the feature extending from pedestal 50 engages insert module 14, preventing its removal from universal cradle 16.

Figure 5:
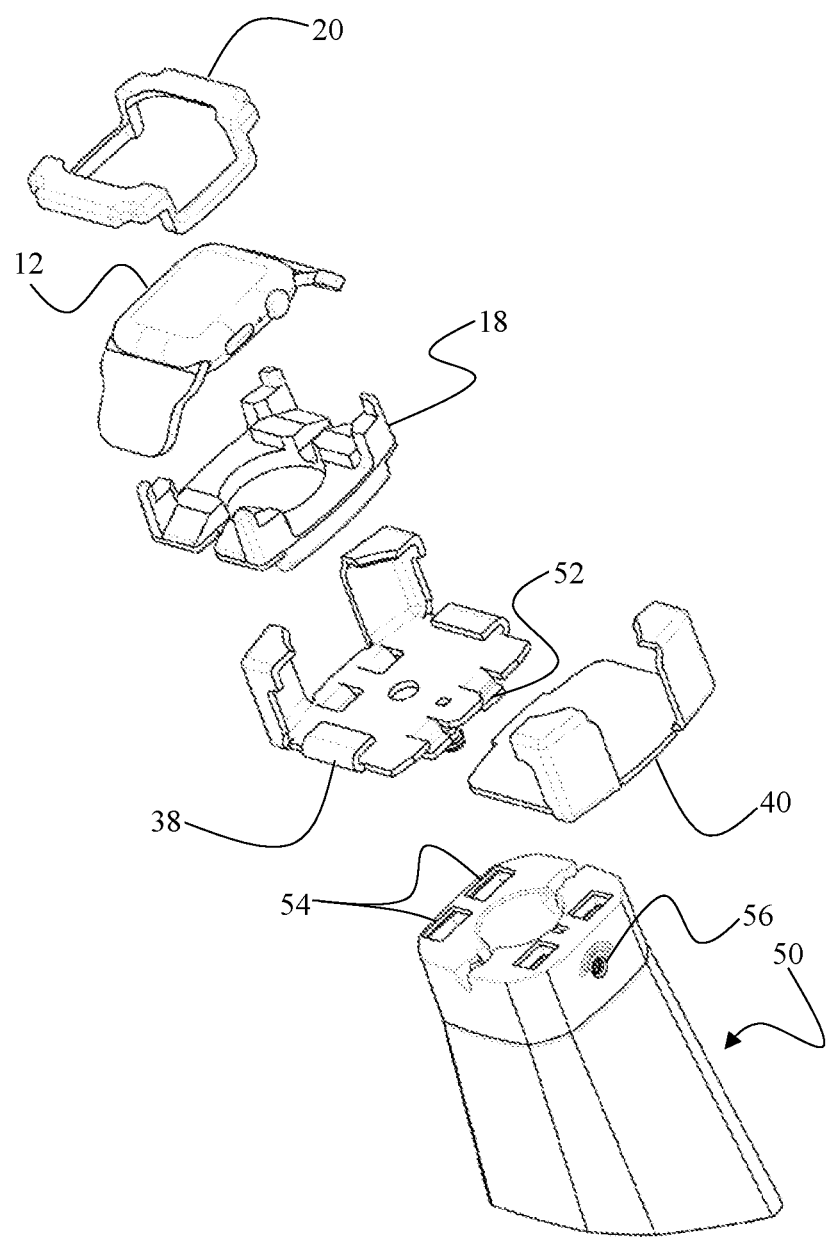
FIG. 5 is an exploded perspective view depicting an embodiment of the anti-theft device having a pedestal anchored to a display surface.
Figure 6A:
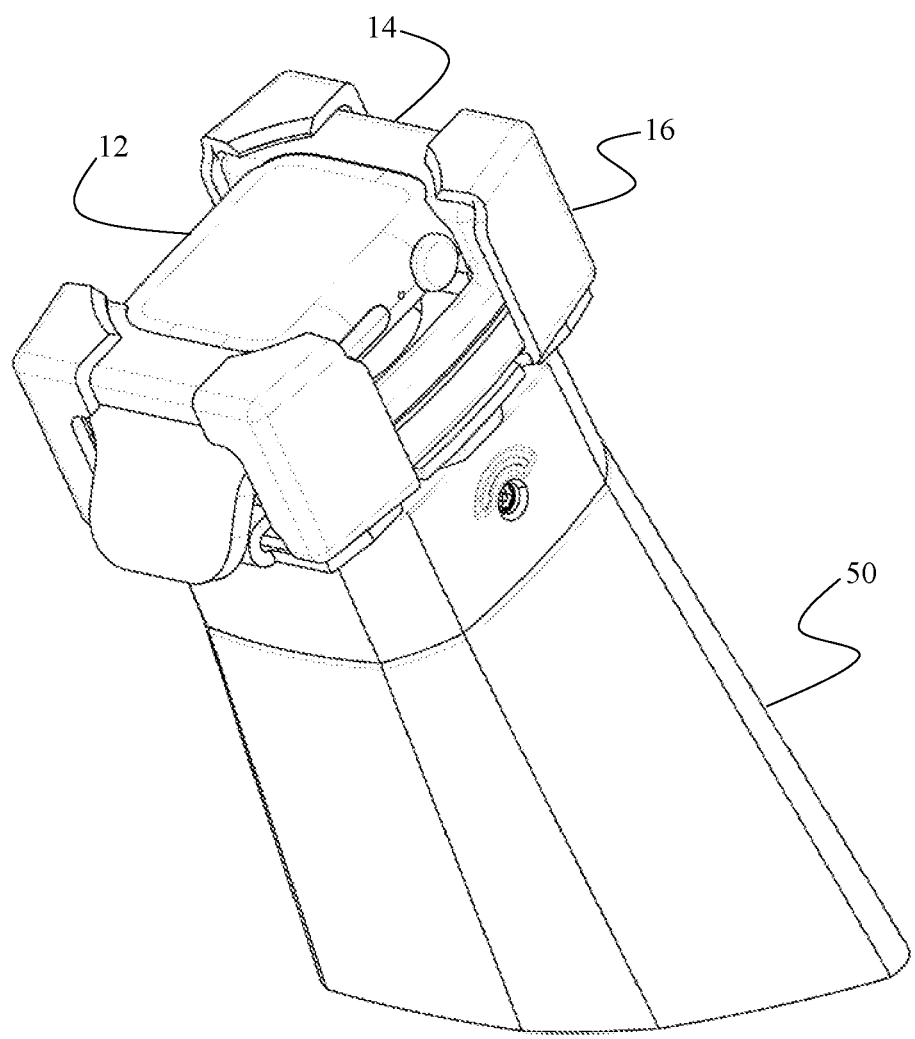
FIG. 6A is a perspective view of the anti-theft device secured to a pedestal.
Figure 6B:
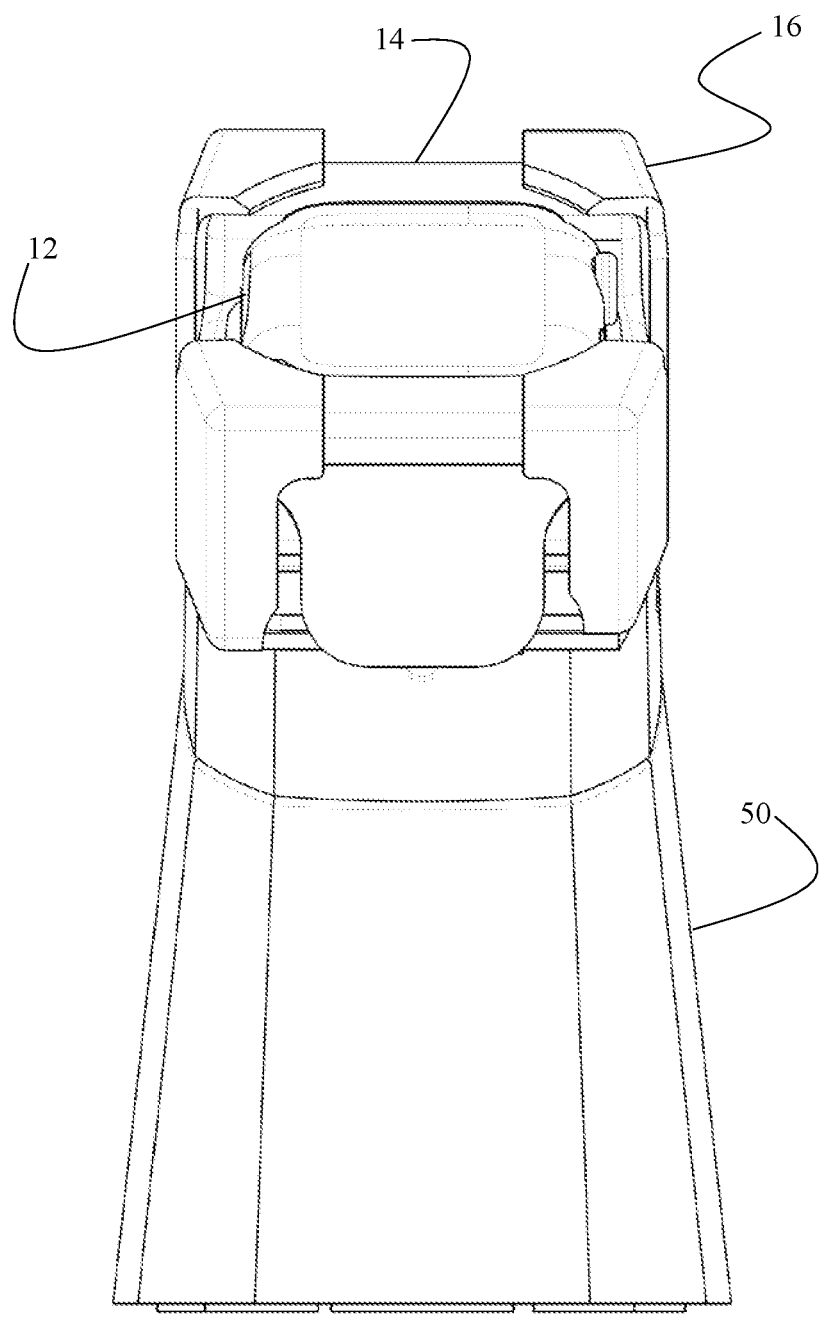
FIG. 6B is a front view of the anti-theft device secured to a pedestal.
Figure 6C:
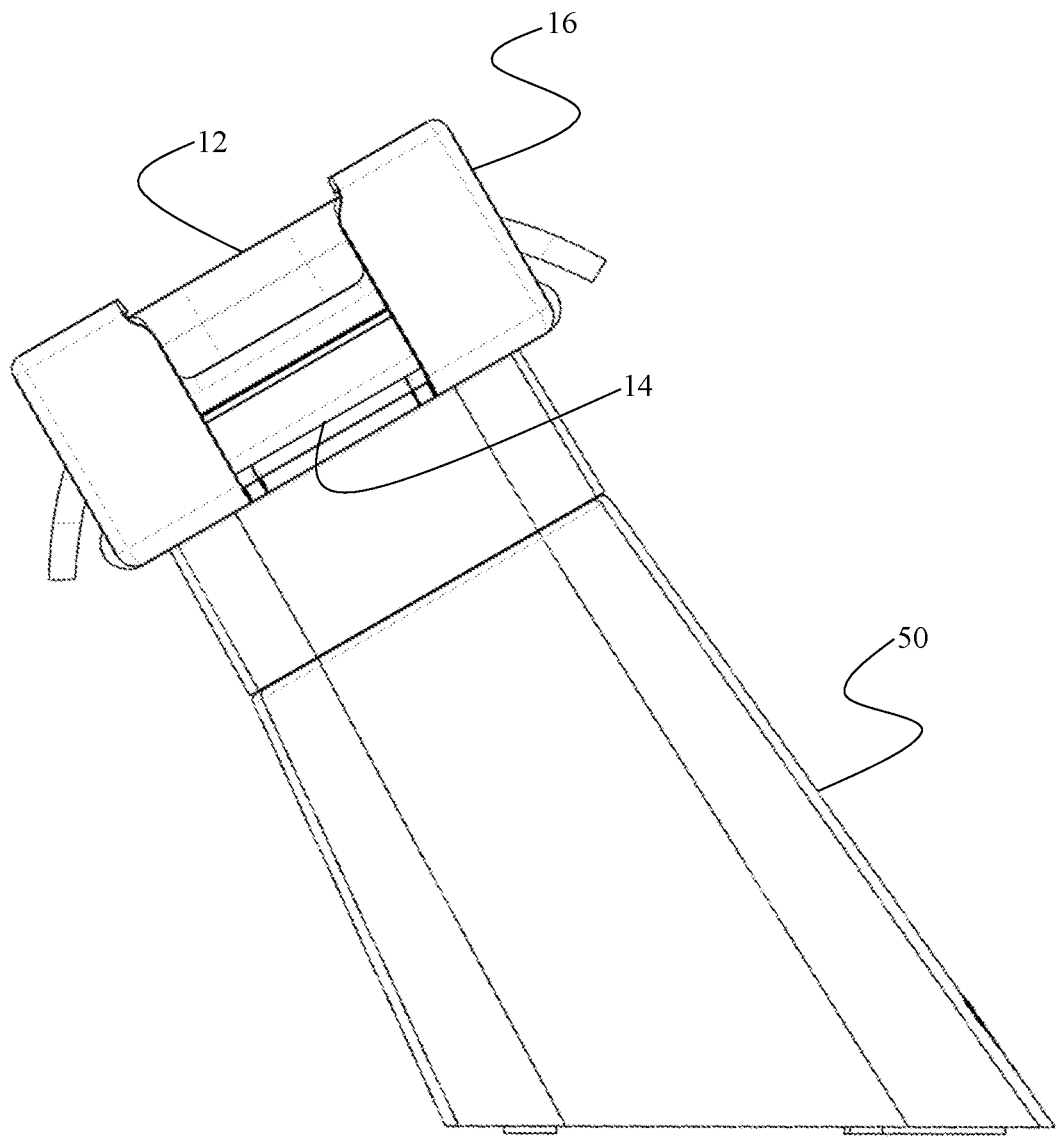
FIG. 6C is a side view of the anti-theft device secured to a pedestal.

A method of securing wearable electronic 12 within anti-theft device 10 can be explained with reference to FIGS. 4C and 5. First, wearable electronic 12 is placed into the interstitial space defined within bottom portion 18 of insert module 14. Next, top portion 20 of insert module 14 is interlocked with bottom portion 18, thus immobilizing wearable electronic 12 within the insert module 14. In the next step, insert module 14 is placed between grips 42 of first and second interlocking components 38 and 40 of universal cradle 16. Then, first and second interlocking components 38 and 40 are interlocked together by sliding base plate 46 of the second interlocking component 40 into corresponding channels 44 of first interlocking component 38. Locking member 48 is transitioned into its engaged position, in which locking member 48 immobilizes first and second interlocking components 38 and 40 in the locked configuration. At this point, insert module 14 is secured within grips 42 of universal cradle 16. Finally, after insert module 14 is secured within the locked universal cradle 16, universal cradle 16 is secured to pedestal 50 by inserting hooks 52 of universal cradle 16 into corresponding apertures 54.

To initiate releasing wearable electronic 12 from anti-theft device 10, a key or other tool must be inserted into opening 56 of pedestal 50 to unlock the locking mechanism of pedestal 50 to release universal cradle 16. Only then is access port 49 on locking member 48 revealed. Next, a semi-specialized tool must be used to transition locking member 48 into its retracted position to release interlocking members 38 and 40 from one another. Then interlocking members 38 and 40 must be separated to release insert module 14 from grips 42. Only after all these steps have been completed, top and bottom portions 20 and 18 of insert module 14 can be separated from one another to release wearable electronic 12.

As evident from the disclosure provided above, anti-theft device 10 provides multiple layers of security: (1) wearable electronic 12 is secured within a custom-fit insert module 14 and cannot be removed therefrom until top portion 20 is separated from bottom portion 18—i.e., insert module 14 is transitioned into its open configuration; (2) insert module 14 is reinforced with a high-strength universal cradle 16, and therefore is configured to withstand tampering attempts, (3) insert module 14 cannot be opened unless it is removed from universal cradle 16; (4) insert module 14 cannot be removed from universal cradle 16 unless interlocking components 38 and 40 of universal cradle 16 are released from one another—i.e., universal cradle 16 is transitioned into its unlocked configuration; (5) universal cradle 16 can only be transitioned into the unlocked configuration by operating locking member 48 using a specialized tool; (6) locking member 48 cannot be accessed unless universal cradle 16 is removed from pedestal 50 to reveal access port 49; and (7) removal of universal cradle 16 from pedestal 50 requires a specialized key or other tool. These multi-layer security features make undetected theft of wearable electronic 12 extremely difficult and highly unlikely.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

What is claimed is:

1. An anti-theft device for securing an article of merchandise, comprising:
   an insert module;
   an interstitial space defined within the insert module, wherein the interstitial space is accessible for receipt or removal of the article of merchandise when the insert module is in an open configuration, and wherein the interstitial space is at least partially enclosed when the insert module is in a closed configuration such that the article of merchandise received into the interstitial space of the insert module cannot be removed therefrom;

a universal cradle having a first interlocking component and a second interlocking component, wherein the first interlocking component and a second interlocking component are positionally adjustable relative to one another;

a first grip disposed on the first interlocking component and a second grip disposed on the second interlocking component, wherein each of the first and the second grips is configured to receive at least a portion of a corner, a surface, or an edge of the insert module, wherein the universal cradle has an unlocked configuration in which the grips of the first and the second components are separated by a first distance sufficient to enable the insert module to be received into the first or the second grip, and an interlocked configuration in which the first and the second grips are separated by a second distance, shorter than the first distance, such that the insert module received into the first and the second grips cannot be removed therefrom, wherein in the interlocked configuration, the first and the second grips retain the insert module in the closed configuration, thereby restraining the insert module from transitioning into the open configuration; and a locking member having a first retracted position, in which the universal cradle is transitionable between the unlocked and the interlocked configurations, and a second engaged position, in which the locking member restrains the first and the second interlocking components against relative movement with respect to one another thereby immobilizing the universal cradle in the interlocked configuration;

wherein to release the article of merchandise received in the interstitial space of the insert module from the anti-theft device, the locking member must be transitioned into the first retracted position, the universal cradle must be transitioned into the unlocked configuration, and the insert module must be transitioned into the open configuration.

2. The anti-theft device of claim 1, wherein the insert module is a first insert module, and wherein the first insert module can be replaced with a second insert module having a second interstitial space shaped to accommodate a second, differently shaped article of merchandise.

3. The anti-theft device of claim 2, wherein exterior dimensions of the first insert module and the second insert module are substantially the same.

4. The anti-theft device of claim 1, wherein the insert module comprises a first portion and a second portion, wherein the first portion and the second portion are coupled together when the insert module is in the closed configuration.

5. The anti-theft device of claim 1, wherein the first interlocking component of the universal cradle comprises a channel configured to receive the second interlocking component.

6. The anti-theft device of claim 1, wherein the first and the second interlocking components of the universal cradle are configured to slide apart to transition the universal cradle into the unlocked configuration and configured to slide toward one another to transition the universal cradle into the interlocked configuration.

7. The anti-theft device of claim 1, wherein the insert module comprises a recess configured to receive a wireless charging device for supplying power to the article of merchandise.

8. The anti-theft device of claim 1, wherein the universal cradle is configured to couple to a pedestal anchored to a display surface.

9. The anti-theft device of claim 8, wherein access to the locking member is concealed when the universal cradle is coupled to the pedestal.

10. The anti-theft device of claim 1, wherein the first and the second interlocking components of the universal cradle are at least partially made of a metal or a metal alloy.

11. The anti-theft device of claim 1, wherein the insert module is at least partially made of a polymer.

12. An anti-theft device for securing an article of merchandise, comprising:

an insert module having an interstitial space shaped to receive the article of merchandise therein;

a universal cradle having a first interlocking component and a second interlocking component, each of the first and the second interlocking components having a grip structured to receive the insert module, the universal cradle having an unlocked configuration in which the grips of the first and the second interlocking components are separated by a first distance sufficient to enable the insert module to be placed therebetween or removed therefrom and an interlocked configuration in which the first distance between the grips is reduced to a second distance insufficient to permit removal of the insert module from the grips, and wherein the article of merchandise received within the interstitial space of the insert module cannot be removed therefrom while the insert module is positioned within the universal cradle and the universal cradle is in the interlocked configuration; and a locking member having a first retracted position in which the first and the second interlocking components can move relative to one another such that the universal cradle is transitionable between the unlocked and interlocked configurations and a second engaged position in which the locking member is configured to immobilize the first and the second interlocking components of the universal cradle in the interlocked configuration by restraining the first and the second interlocking components against relative movement with respect to one another.

13. The anti-theft device of claim 12, wherein the insert module is a first insert module, and wherein the first insert module can be replaced with a second insert module having a second interstitial space shaped to accommodate a second, differently shaped article of merchandise, wherein exterior dimensions of the first insert module and the second insert module are substantially the same.

14. The anti-theft device of claim 12, wherein the insert module comprises a first portion and a second portion, wherein the first portion and the second portion are coupled together when the insert module is in the closed configuration.

15. The anti-theft device of claim 12, wherein the first and the second interlocking components of the universal cradle are configured to slide apart to transition the universal cradle into the unlocked configuration and configured to slide toward one another to transition the universal cradle into the interlocked configuration.

16. The anti-theft device of claim 12, wherein the insert module comprises a recess configured to receive a wireless charging device for supplying power to the article of merchandise.

17. The anti-theft device of claim 12, wherein the universal cradle is configured to couple to a pedestal anchored to a display surface.

18. The anti-theft device of claim 17, wherein access to the locking member is concealed when the universal cradle is coupled to the pedestal.

19. The anti-theft device of claim 12, wherein the first and the second interlocking components of the universal cradle are at least partially made of a metal or a metal alloy.

20. The anti-theft device of claim 12, wherein the insert module is at least partially made of a polymer.

* * * * *